April 27, 1926.
L. FINE
1,582,515
DEMOUNTABLE WHEEL
Filed July 24, 1919  3 Sheets-Sheet 3
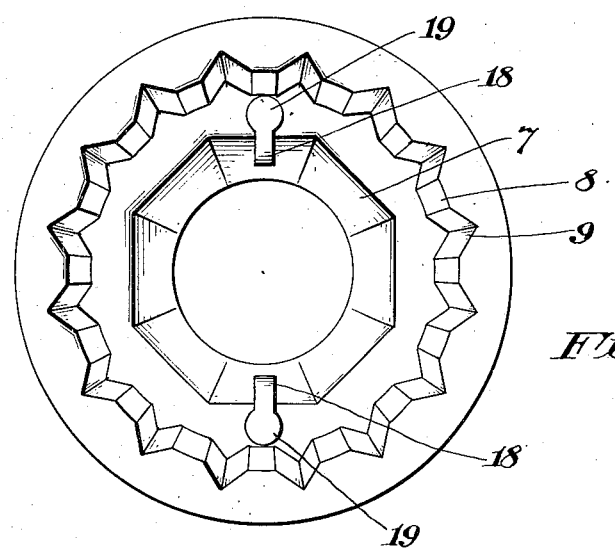
Fig. IV.
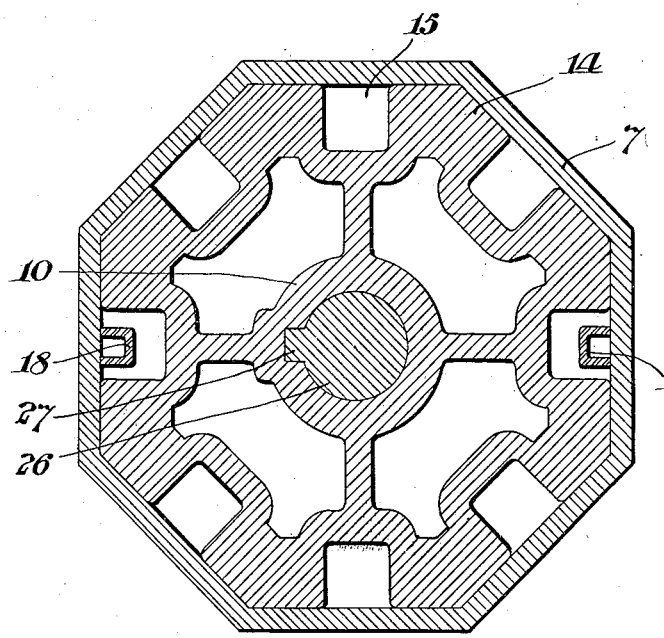
Fig. V.
Inventor:
Lewis Fine,
By Chester H. Braselton
Attorney.

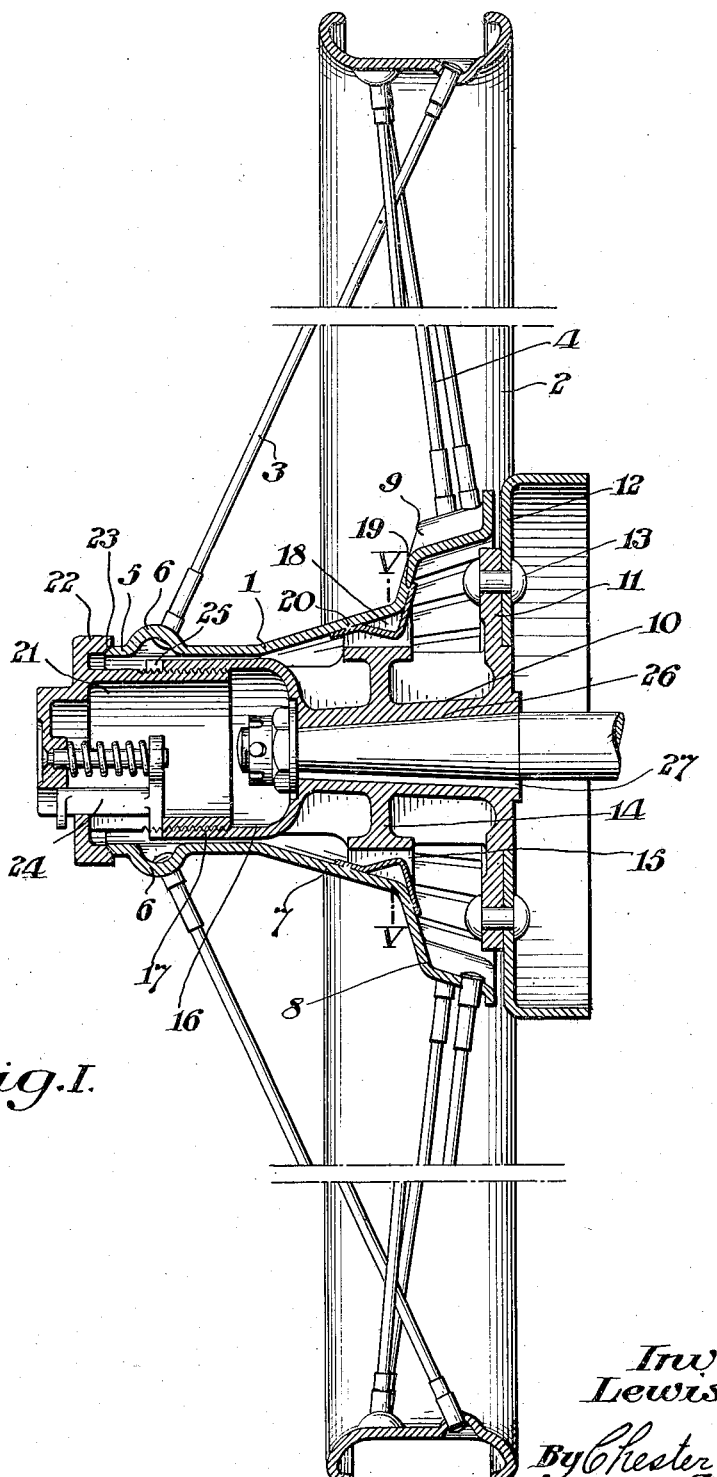
Fig. I.

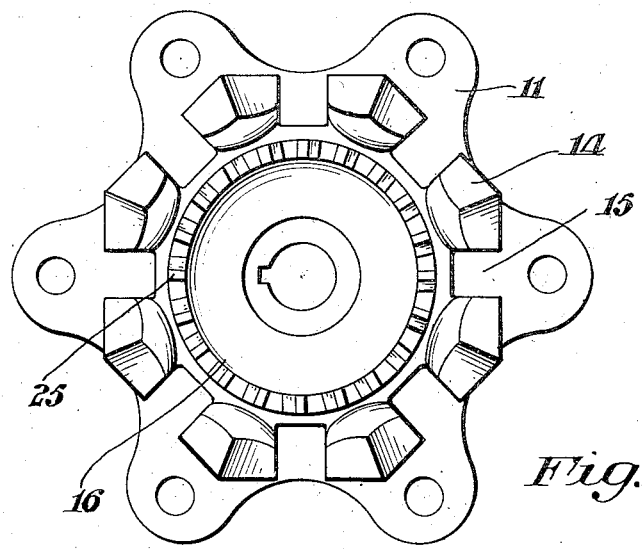
Fig.II.
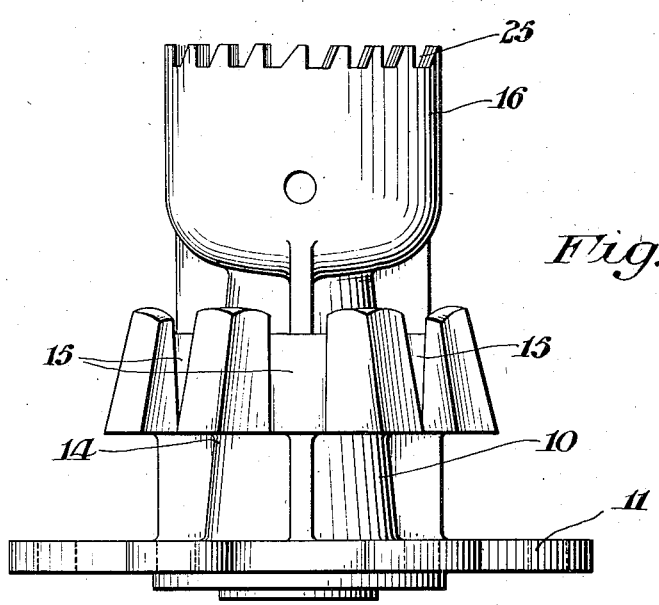
Fig.III.
Inventor:
Lewis Fine,
By Chester H. Braselton
Attorney.

Patented Apr. 27, 1926.

1,582,515

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

DEMOUNTABLE WHEEL.

Application filed July 24, 1919. Serial No. 312,894.

*To all whom it may concern:*

Be it known that I, LEWIS FINE, a citizen of the United States, residing at Philadelphia, county of Philadelphia, State of Pennsylvania, have invented certain new and useful Improvements in Demountable Wheels, of which I declare the following to be a full, clear, and exact description.

This invention relates to improvements in demountable wheels, and more particularly to demountable wheels of the type used on motor vehicles comprising an inner permanent hub member, and a wheel body having an outer hub shell mounted on said inner hub member and retained in place thereon and in driving engagement therewith by a hub cap mounted on one of the members and engaging the other.

One of the main objects of my invention is to provide a demountable wheel so constructed that it is particularly adapted to quantity production, and may be made at a comparatively low cost.

Another object of my invention is to provide a demountable wheel construction which will be safer and more nearly "fool-proof" than other wheel constructions with which I am familiar.

Another object of my invention is to provide a demountable wheel construction of such a nature that the hub cap cannot be put on unless the outer and inner hubs are meshed in driving engagement.

Another object of my invention is to provide a demountable wheel construction in which the hub cap is mounted on, and locked to the inner hub, so that any twisting or movement of the outer hub shell on the inner hub will be ineffective to unscrew the hub cap.

Other objects, and objects relating to economies of manufacture and details of construction, will definitely appear from the detailed description to follow.

I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. I is a vertical sectional view taken through a wheel embodying my invention.

Fig. II is a view in end elevation of the inner hub member.

Fig. III is a view in side elevation of said inner hub member.

Fig. IV is a view in end elevation of an outer hub shell, looking from the inside of the wheel.

Fig. V is a sectional view through the hub members, taken on the line V—V of Fig. I.

In the drawings, similar numerals refer to similar parts thoughout the several views.

In demountable wheels, in which the outer hub shell is mounted on an inner hub member and maintained in driving engagement therewith by the meshing of certain drive members, it has sometimes happened, particularly in wheels of this type disclosed herein in which the intermeshing drive members are of slight variation in radius and of relatively great axial taper, that the outer hub shell is mounted in place in such position that the drive members are not in mesh, and, due to the fact that these drive members are concealed within the wheel hub, the driver of the automobile is unaware of this fact and screws the hub cap in place without effecting a meshing of the drive members. When this has occurred, it is apt to result in a twisting or rotation of the outer wheel hub on the inner hub, and sometimes results in the wheel coming off with the possibilities of a serious accident. I have provided a wheel construction of such a nature that this cannot take place.

Referring to the numbered parts of the drawing, I have shown a wheel comprising an outer hub shell 1, a rim 2, connected with said hub shell by the tension spokes 3 and 4. The outer end portion 5, of the hub shell, is substantially cylindrical, and on said outer end there are provided a plurality of bosses or hemispherical indentations 6, stuck up from said shell and serving to anchor the inner ends of the spokes 3. The intermediate portion of the hub shell 1 is of substantial taper and polygonal in cross section so that the inner surface of said portion 7 presents substantially a surface corresponding to that of the frustrum of a pyramid. The inner end of the hub shell 1 is a radially extending flange 8 from which a plurality of seats 9 are struck up to form anchorages for the inner ends of the spokes 4.

The inner hub member 10 has a radially extending flange 11, at its inner end, to which the brake drum 12 is secured by the rivets 13. This inner hub member also has an intermediate flange 14 forming the seating portion of the inner hub. The exterior of this flange corresponds in shape to that of the frustrum of a pyramid, and hence cooperates with the portion 7 of the outer hub member to effect a seating and driving engagement between said members. A recess or slot 15 is formed in each face of the surface of the flange 14 extending longitudinally of said face and being located centrally thereof. The location of these recesses or slots appears very clearly in Figs. III and V. The inner hub member 10 has a cup-shaped outer end 16 which is internally threaded at 17.

A pair of keys or projections 18, of channel shaped cross section, are secured to the inner surface of the portion 7 of the outer hub member, being spot-welded thereto at the points 19 and 20. These keys or projections are located centrally of diametrically opposite faces of the surface 7 of the outer hub shell and extend longitudinally thereof, being so located as to enter into any of the recesses or slots 15 with which they are in line.

The hub cap 21 is substantially cylindrical in form and its inner end is externally threaded so as to screw into the outer cup-shaped end of the inner hub. The hub cap has a radially extending flange 22, near its outer end, which flange has a bevelled edge 23 engaging a correspondingly bevelled edge on the outer end of the outer hub shell so as to center the wheel as the hub cap is screwed up. A spring pressed latch 24 is carried by said hub cap and moves in a direction parallel to the axis of the hub cap and engages the ratchet teeth 25 formed on the outer end of the cup-shaped portion 16 of the inner hub. This latch has a portion to be engaged by a wrench applied to the hub cap to unscrew the same so that the act of applying the wrench withdraws the latch from engagement with the ratchet teeth. The inclination of the ratchet teeth 25 is such that the latch rides over them when the hub cap is screwed up, but the teeth resist any rotation of the hub cap in the reverse direction. The inner hub 10 is mounted on the tapered end 26 of the axle shaft and secured thereto by the usual nut and key 27.

From the description of the parts given above, the operation of this device should be very readily understood. The outer hub shell is held in driving engagement with the inner hub due to the co-operation of the seating surfaces 7 and 14 of polygonal cross-section. The outer hub shell cannot be mounted with the surface 7 engaging the surface 14 unless the keys or projections 18 are disposed in two of the recesses or slots 15. Therefore, the hub cap 21 cannot be screwed into place on the inner hub unless the keys or projections 18 are in place, and, when the keys or projections 18 are in place, the faces of the frustro-pyramidal surfaces 7 and 14 are in line with each other, and the outer and inner hubs are meshed in driving engagement with each other. Because of this construction, it is impossible to mount the wheel in any but the correct arrangement.

The hub cap 21 screws into the inner hub and engages the outer end of the outer hub to force it up on the tapered seating surface of the inner hub. This hub cap is locked to the inner hub and hence if, for any reason, as in case the keys or projections 18 were accidentally omitted and the outer hub mounted on the inner hub with the drive members out of engagement, any twisting or turning of the outer hub on the inner hub will have absolutely no effect to unscrew the hub cap.

I have not described the construction of the hub cap locking device in detail in this application, as I have filed an application, Serial No. 320,179 covering this construction.

I am aware that the particular embodiment of my invention, which I have shown and described here, is susceptible of considerable variation without departing from the spirit thereof, and, therefore, I desire to claim the same broadly, as well as specifically as indicated by the appended claims.

Having thus described my invention, what I claim as new and desire to secure by Letters Patent is:—

1. In a demountable wheel, the combination of an inner hub, an outer hub removably mounted thereon, intermeshing means preventing the rotation of said outer hub relative to said inner hub, which means is of such slight variation in radius and so great axial taper that the hubs may occupy substantially correct relative axial positions without effective engagement of the intermeshing means, a hub cap mounted on one of said hubs and engaging the other to hold the two hubs in engagement, and projecting means other than said intermeshing means operating as a stop for preventing the attachment of said hub cap except when said intermeshing means are angularly in intermeshing relationship with respect to each other.

2. In a demountable wheel, the combination of an inner hub, an outer hub removably mounted thereon, a hub cap mounted on one of said hubs and engaging the other to hold the two hubs in engagement, intermeshing means itself constituting a primary means of registration preventing the rotation of said outer hub relative to said inner hub, but which means is of such small variation in radius and so great axial taper that the hubs may occupy approximately correct relative axial positions without effective registering relationship of the intermeshing means, and means for preventing the attachment of said hub cap except when the said intermeshing means are angularly in effective registering relationship with each other, said last named means comprising an obstruction on one of said hubs and a formation on the other of said hubs adapted to receive said obstruction only when the intermeshing means are in relative angular positions approximating their intermeshing relationship with each other.

3. In a demountable wheel, the combination of an inner hub, an outer hub removably mounted thereon, a hub cap mounted on one of said hubs and engaging the other to hold the two hubs in engagement, intermeshing means itself constituting a primary means of registration and preventing the rotation of said outer hub relative to said inner hub, which means is of such slight variation in radius and so great axial taper that the hubs may occupy substantially correct relative axial positions without effective registering relationship of the intermeshing means, and means for preventing the attachment of said hub cap except when the said intermeshing means are angularly in effective registering relationship with each other, said last-named means comprising an obstruction on one of said hubs and a formation on the other of said hubs adapted to receive said obstruction in a plurality of angular positions each corresponding to an approximate angular intermeshing relationship of said intermeshing means.

In testimony whereof, I affix my signature.

LEWIS FINE.